United States Patent
Yamae

(10) Patent No.: US 10,443,819 B2
(45) Date of Patent: Oct. 15, 2019

(54) LIGHTING DEVICE, LIGHTING DEVICE MANUFACTURING METHOD, AND LIGHT DISTRIBUTOR

(71) Applicant: PANASONIC INTELLECTUAL PROPERTY MANAGEMENT CO., LTD., Osaka (JP)

(72) Inventor: Kazuyuki Yamae, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 100 days.

(21) Appl. No.: 15/786,834

(22) Filed: Oct. 18, 2017

(65) Prior Publication Data

US 2018/0119925 A1 May 3, 2018

(30) Foreign Application Priority Data

Oct. 27, 2016 (JP) .................. 2016-211007

(51) Int. Cl.
*F21V 13/04* (2006.01)
*F21S 8/02* (2006.01)
(Continued)

(52) U.S. Cl.
CPC ............... *F21V 13/04* (2013.01); *F21S 8/02* (2013.01); *F21V 5/004* (2013.01); *F21V 5/04* (2013.01); *F21V 5/045* (2013.01); *F21V 17/06* (2013.01); *F21V 19/02* (2013.01); *F21V 21/04* (2013.01); *G02B 3/08* (2013.01); *G02B 7/02* (2013.01); *G02B 27/095* (2013.01); *G02B 27/0938* (2013.01); *G02B 27/0983* (2013.01); *F21K 9/20* (2016.08); *F21K 9/68* (2016.08); *F21S 8/00* (2013.01); *F21V 5/008* (2013.01); *F21V 21/28* (2013.01); *F21V 21/30* (2013.01);
(Continued)

(58) Field of Classification Search
CPC .. F21V 5/045; F21V 5/04; F21V 13/04; G02B 27/0983; G02B 27/0938; G02B 3/08; G02B 27/095
See application file for complete search history.

(56) References Cited

U.S. PATENT DOCUMENTS

2006/0087025 A1* 4/2006 Shimizu ........... B29D 11/00278
257/696
2012/0075883 A1* 3/2012 Chen ..................... G02B 6/002
362/607
(Continued)

FOREIGN PATENT DOCUMENTS

JP 2011-014533 1/2011
JP 5698861 4/2015

*Primary Examiner* — Evan P Dzierzynski
(74) *Attorney, Agent, or Firm* — Greenblum & Bernstein, P.L.C.

(57) ABSTRACT

A lighting device includes a light source and a light distributor disposed on a light emission side of the light source. The light distributor includes an entrance surface through which light enters and an exit surface through which the light that enters through the entrance surface exits. At least one of the entrance surface and the exit surface includes concave regions. Each of the concave regions includes a smooth concave surface. The concave regions control distribution of light from the light source that is refracted or reflected by an optical lens or a reflective component.

20 Claims, 10 Drawing Sheets

(51) Int. Cl.

| | | |
|---|---|---|
| *F21V 5/04* | (2006.01) | |
| *F21V 17/06* | (2006.01) | |
| *F21V 19/02* | (2006.01) | |
| *F21V 21/04* | (2006.01) | |
| *G02B 7/02* | (2006.01) | |
| *F21V 5/00* | (2018.01) | |
| *G02B 3/08* | (2006.01) | |
| *G02B 27/09* | (2006.01) | |
| *F21K 9/20* | (2016.01) | |
| *F21K 9/68* | (2016.01) | |
| *F21Y 115/10* | (2016.01) | |
| *F21S 8/00* | (2006.01) | |
| *F21V 21/28* | (2006.01) | |
| *F21V 23/00* | (2015.01) | |
| *F21V 21/30* | (2006.01) | |
| *F21Y 115/20* | (2016.01) | |
| *F21Y 115/15* | (2016.01) | |

(52) U.S. Cl.
CPC ......... *F21V 23/002* (2013.01); *F21Y 2115/10* (2016.08); *F21Y 2115/15* (2016.08); *F21Y 2115/20* (2016.08)

(56) References Cited

U.S. PATENT DOCUMENTS

| | | | | |
|---|---|---|---|---|
| 2012/0212965 A1* | 8/2012 | Nakamura | ............... | F21V 13/04 362/311.09 |
| 2015/0078004 A1* | 3/2015 | Harbers | ................ | F21V 17/101 362/293 |
| 2015/0308650 A1* | 10/2015 | De Kievit | ............ | B60Q 1/2665 362/516 |

* cited by examiner

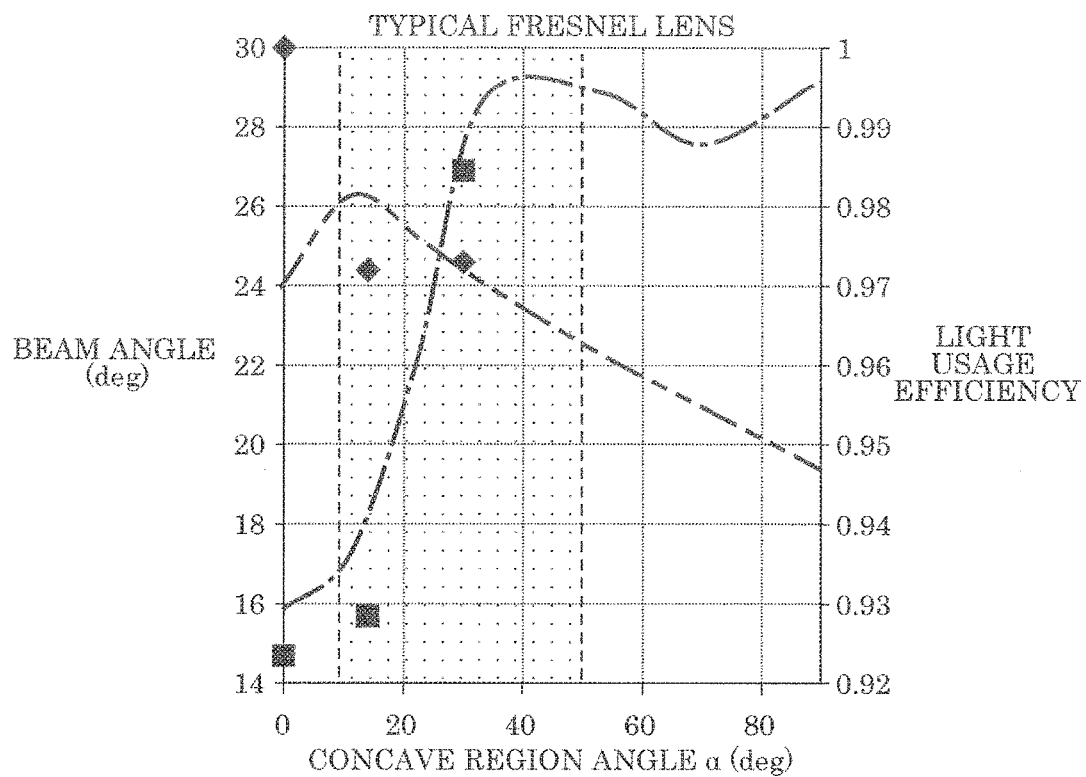
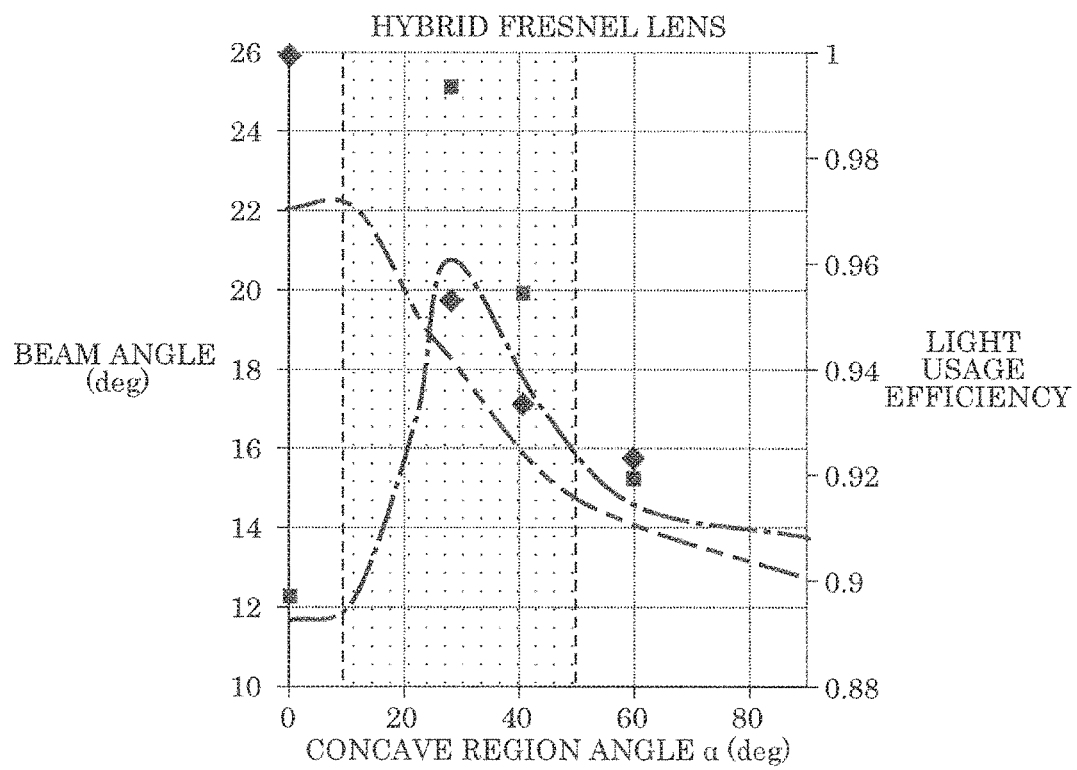

FIG. 10

| CONCAVE REGION PLAN VIEW | NO CONCAVE REGION | (a) | (b) | (c) | (d) |
|---|---|---|---|---|---|
| EMITTED LIGHT | BRIGHT / DARK | BRIGHT / DARK | BRIGHT / DARK | BRIGHT / DARK | BRIGHT / DARK |
| X AXIS DIRECTION ANGLE α | 0 (deg) | 25 (deg) | 30 (deg) | 45 (deg) | 70 (deg) |
| Y AXIS DIRECTION ANGLE α | 0 (deg) | 15 (deg) | 10 (deg) | 10 (deg) | 0 (deg) |
| 1/2 BEAM ANGLE (X × Y) | 10 (deg) × 10 (deg) | 16 (deg) × 11 (deg) | 21 (deg) × 10 (deg) | 27 (deg) × 13 (deg) | 40 (deg) × 9 (deg) |

LIGHTING DEVICE, LIGHTING DEVICE MANUFACTURING METHOD, AND LIGHT DISTRIBUTOR

CROSS REFERENCE TO RELATED APPLICATION

This application claims the benefit of priority of Japanese Patent Application Number 2016-211007 filed on Oct. 27, 2016, the entire content of which is hereby incorporated by reference.

BACKGROUND

1. Technical Field

The present disclosure relates to a lighting device, a lighting device manufacturing method, and a light distributor.

2. Description of the Related Art

A lighting device including a light source and a light distribution converter panel that alters the light distribution of the light source is known (for example, see Japanese Patent No. 5698861).

With this lighting device, it is possible to alter the form in which the light is emitted from the light source by attaching light distribution converter panel.

SUMMARY

However, in a conventional lighting device, it is conceivable to, for example, sandblast the light distribution converter panel to alter the form in which the light is emitted from the light source, but the broader the light distribution is, the more difficult the light distribution angle is to control, making it difficult to achieve the desired light distribution.

Moreover, when sandblasting is performed, light from the light source is scattered, which produces stray light and reduces the light usage efficiency of the light source.

In light of this, the present disclosure was conceived in order to overcome the above problem, and has an object to provide a lighting device, lighting device manufacturing method, and light distributor capable of controlling a broad distribution of light and inhibiting a reduction in light usage efficiency.

In order to realize the object described above, a lighting device according to one aspect of the present invention includes a light source and a light distributor disposed on the light emission side of the light source. The light distributor includes an entrance surface through which light enters and an exit surface through which the light that enters through the entrance surface exits. At least one of the entrance surface and the exit surface includes concave regions, each of the concave regions including a smooth concave surface. The concave regions control distribution of light from the light source that is refracted or reflected by an optical component.

Moreover, in order to realize the object described above, a light distributor according to one aspect of the present invention is disposed on the light emission side of a light source, and includes: an entrance surface through which light from the light source enters; an exit surface through which the light that enters through the entrance surface exits; and concave regions dispersed in at least one of the entrance surface and the exit surface. Each of the concave regions includes a smooth concave surface. The concave regions control distribution of the light from the light source that is refracted or reflected by an optical component.

According to the present disclosure, a broad distribution of light can be controlled and a reduction in light usage efficiency can be inhibited.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 8 illustrates the relationship between angles of the concave region, beam angles, and light usage efficiency in the lighting device according to the embodiment;

FIG. 9 illustrates the relationship between the concave region, beam angles, and light usage efficiency in the lighting device according to the embodiment;

FIG. 10 illustrates the relationship between the concave regions of the light distributor according to this embodiment and emitted light;

In FIG. 11, (b) is a plan view of the concave regions formed in a workpiece; In FIG. 11, (c) is a plan view of the concave regions formed in a workpiece;

In FIG. 12, (b) is a graph of the profile roughness of a concave region of the light distributor according to this embodiment, taken at line XII-XII through the concave region in (a) in FIG. 12; In FIG. 12, (c) is an enlarged view of the section surrounded by the square in (b) in FIG. 12;

In FIG. 13, (b) is a graph of the profile roughness of a concave region of the light distributor according to the comparative example, taken at line XIII-XIII through the concave region in (a) in FIG. 13; and In FIG. 13, (c) is an enlarged view of the section surrounded by the square in (b) in FIG. 13.

DETAILED DESCRIPTION OF THE EMBODIMENT

Figure 1:
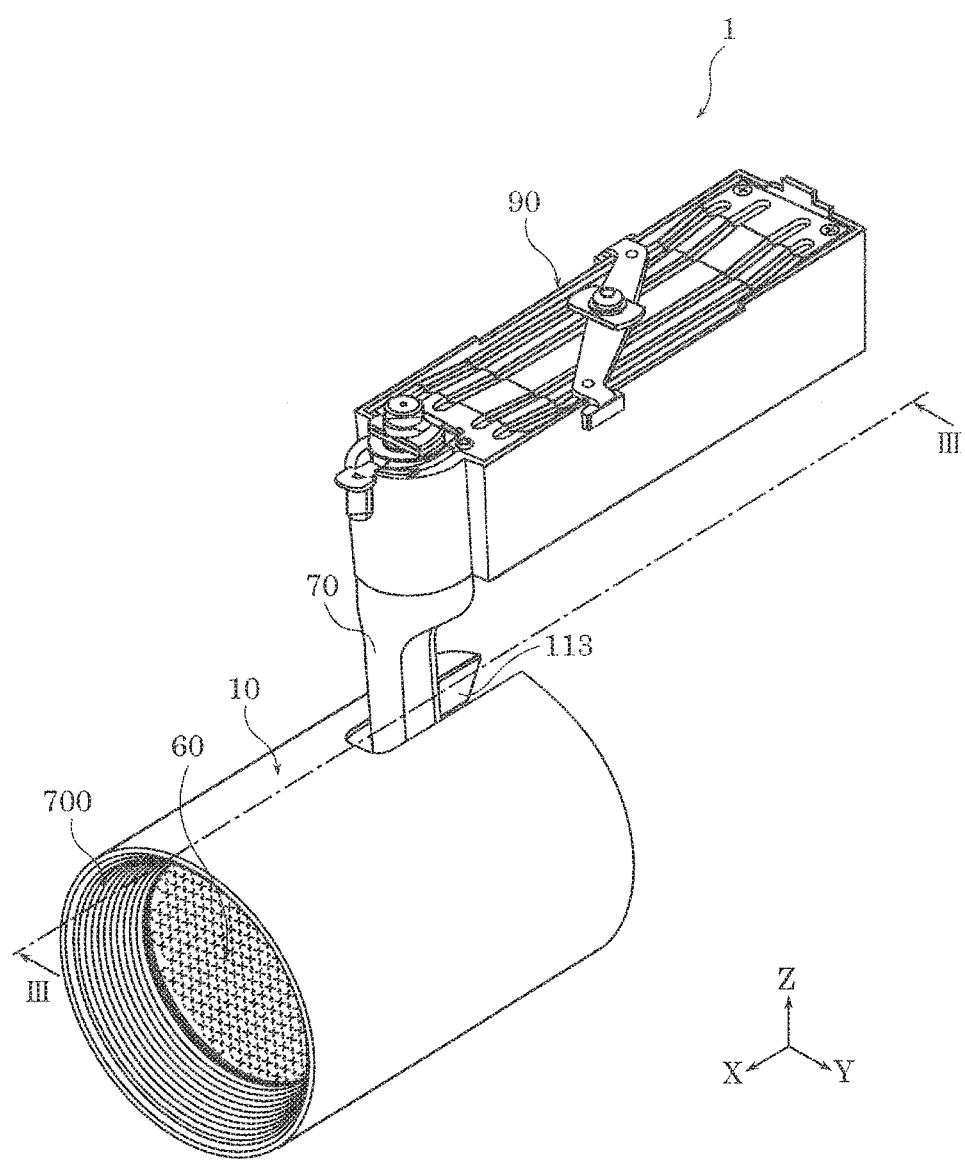
FIG. 1 is a perspective view of the lighting device according to the embodiment.

The following describes an embodiment with reference to the drawings. Note that the embodiment described below shows a specific example of the present disclosure. The numerical values, shapes, materials, elements, the arrangement and connection of the elements, etc., indicated in the following embodiment are mere examples, and therefore do not intend to limit the inventive concept. Therefore, among elements in the following embodiment, those not recited in any of the independent claims defining the broadest the inventive concept are described as optional elements.

Moreover, "approximately" means, for example in the case of "approximately the same," not only exactly the same, but what would be recognized as essentially the same as well. The same also applies to the term "vicinity".

Note that the drawings are represented schematically and are not necessarily precise illustrations. Additionally, like reference signs indicate like elements in the drawings, and overlapping descriptions thereof are omitted or simplified.

Hereinafter, the lighting device, lighting device manufacturing method, and light distributor according to an embodiment of the present disclosure will be described.

Embodiment (Configuration)

First, the configuration of lighting device 1 according to this embodiment will be described with reference to FIG. 1 through FIG. 6.

Figure 2:
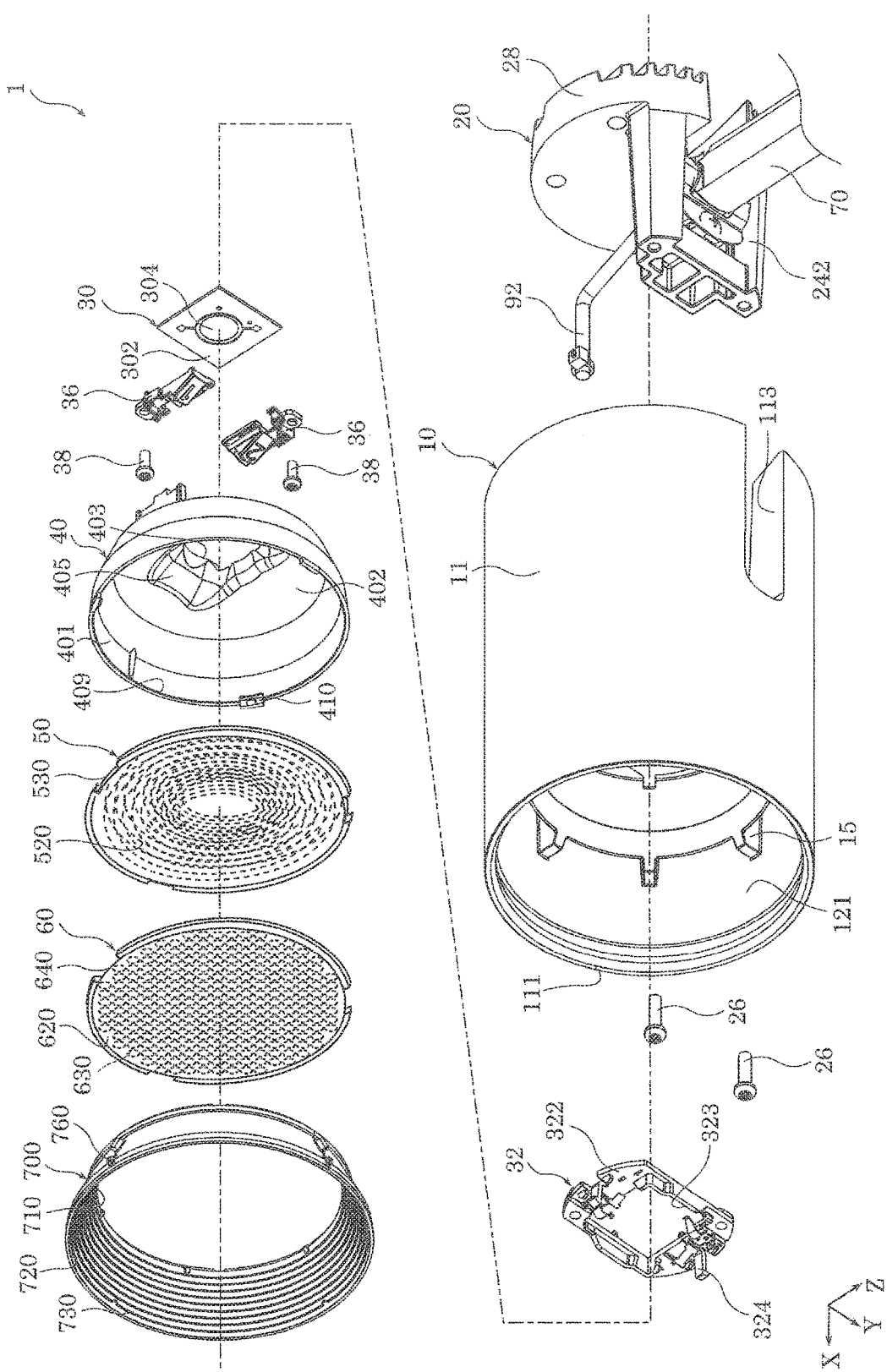
FIG. 2 is an exploded perspective view of the lighting device according to the embodiment.
Figure 3:
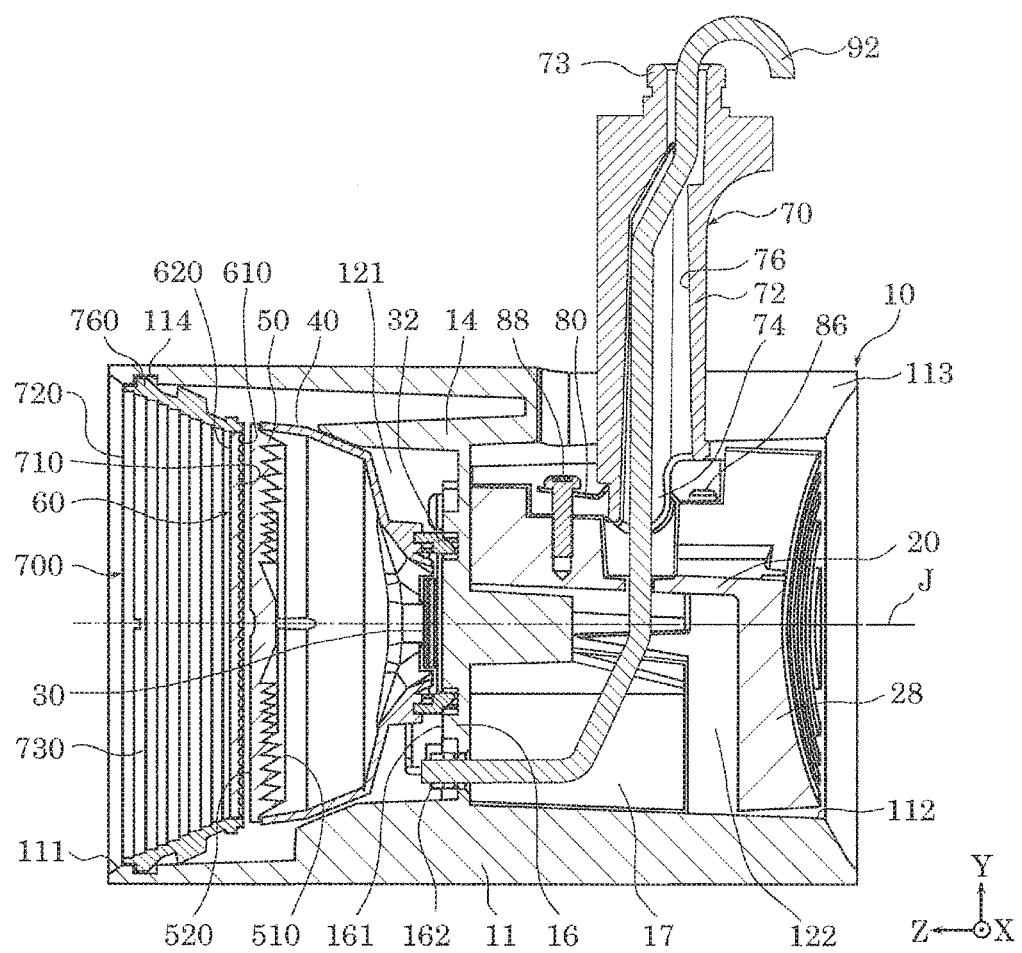
FIG. 3 is a cross sectional view of the lighting device according to the embodiment, taken at line III-III in FIG. 1.
Figure 4:
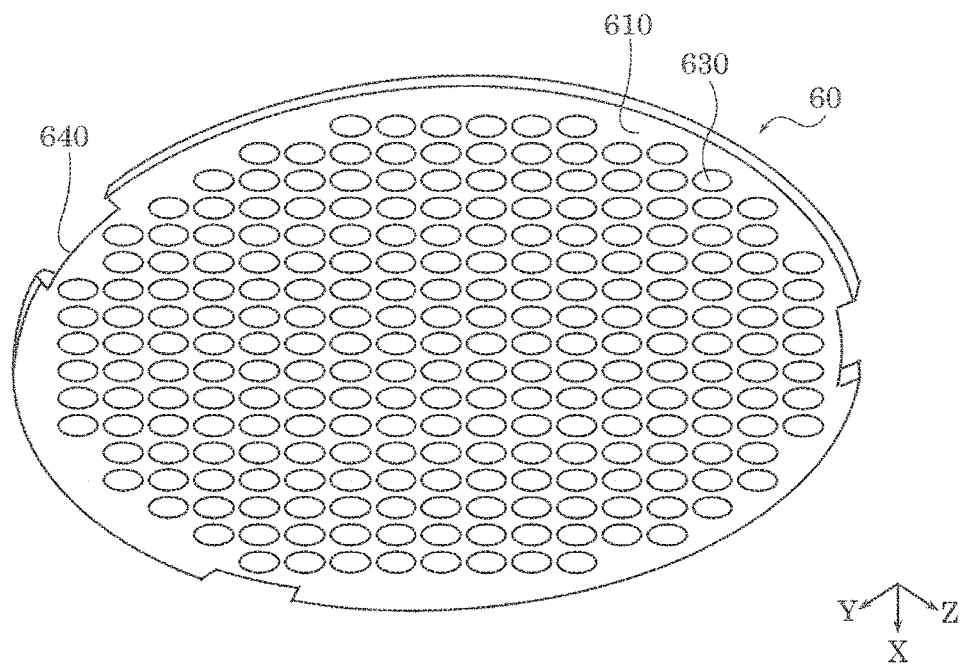
FIG. 4 is a perspective view of the light distributor in the lighting device according to the embodiment.
Figure 5:
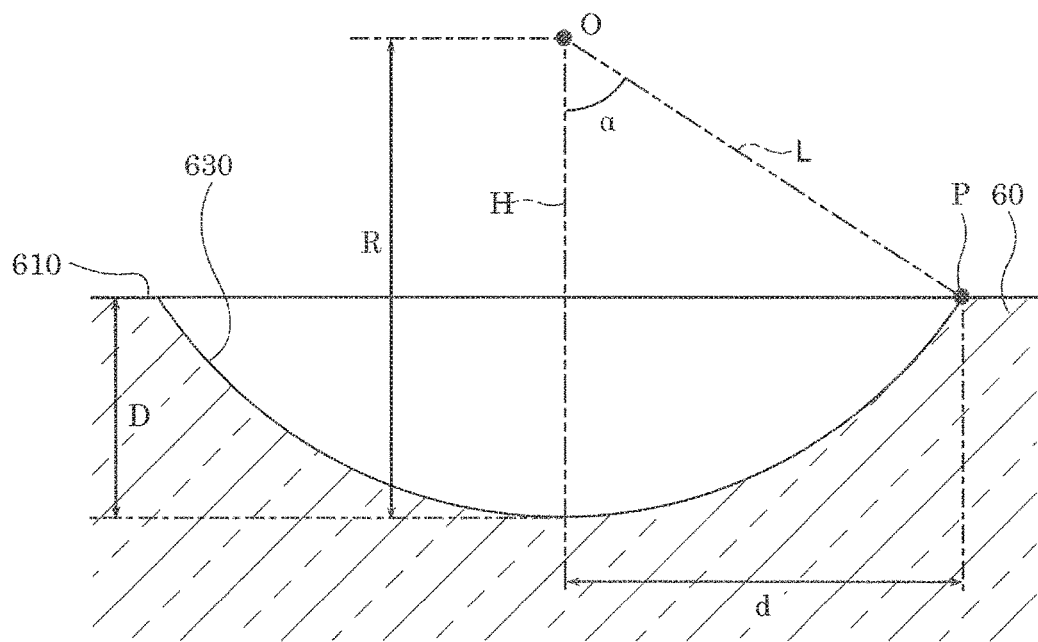
FIG. 5 is a cross sectional view of a concave region of the light distributor in the lighting device according to the embodiment.
Figure 6:
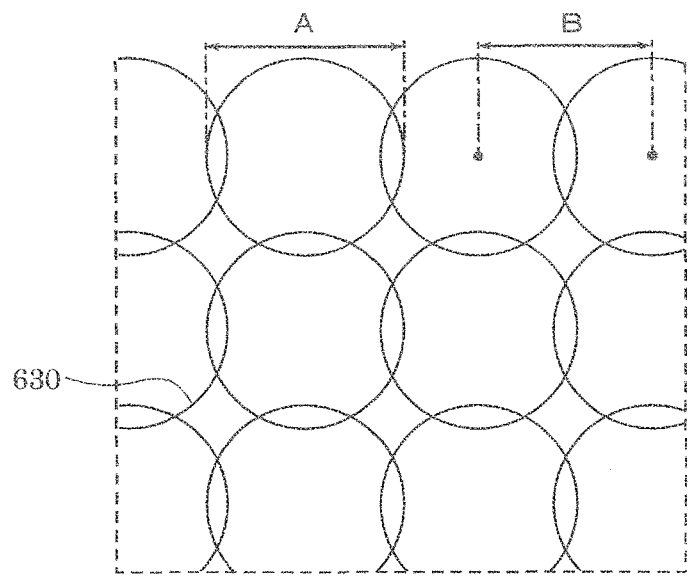
FIG. 6 is a conceptual diagram of concave regions of the light distributor in the lighting device according to the embodiment.

FIG. 1 is a perspective view of lighting device 1 according to the embodiment. FIG. 2 is an exploded perspective view of lighting device 1 according to the embodiment. FIG. 3 is a cross sectional view of lighting device 1 according to the embodiment, taken at line III-III in FIG. 1. FIG. 4 is a perspective view of light distributor 60 in lighting device 1 according to the embodiment. FIG. 5 is a cross sectional view of concave region 630 of light distributor 60 in lighting device 1 according to the embodiment. FIG. 6 is a conceptual diagram of concave regions 630 of light distributor 60 in lighting device 1 according to the embodiment.

In FIG. 1, in lighting device 1, the lengthwise direction of the lamp body corresponds to the X axis, the widthwise direction of the lamp body corresponds to the Y axis, and the up and down directions correspond to the Z axis. The directions illustrated in FIG. 2 and subsequent figures correspond to the directions illustrated in FIG. 1. Note that in FIG. 1, the up, down, left, right, front, and back directions may change depending on the application, and as such, are not limited to the example illustrated in FIG. 1. The same applies to subsequent figures.

As illustrated in FIG. 1 and FIG. 2, lighting device 1 includes lamp body 10, light source 30, attachment component 32, reflective component 40 (one example of the optical component), optical lens 50 (one example of the optical component), light distributor 60, light control component 700, arm 70, and power supply box 90.

(1-1. Lamp Body)

As illustrated in FIG. 3, lamp body 10 internally houses, for example, light source 30, attachment component 32, reflective component 40, optical lens 50, light distributor 60, and light control component 700. Lamp body 10 also functions as a heat sink that dissipates heat generated by light source 30.

Lamp body 10 includes tubular part 11 and barrier wall part 16.

In this embodiment, tubular part 11 of lamp body 10 is an approximate cylinder with both ends open. Barrier wall part 16 is integrally formed with tubular part 11 so as to divide the internal space in tubular part 11 into front space 121 and rear space 122. Barrier wall part 16 efficiently conducts heat generated by light source 30 to tubular part 11. Here, since tubular part 11 is exposed to the outside, tubular part 11 is cooled by ambient air.

Lamp body 10 defines front opening 111, rear opening 112, and side opening 113. Front opening 111 is located on the X axis positive direction side of lamp body 10 (i.e., in the front of lamp body 10). Rear opening 112 is located on the X axis negative direction side of lamp body 10 (i.e., in the rear of lamp body 10). Side opening 113 is a slit formed in the side surface of tubular part 11.

In front space 121 of lamp body 10, light source 30 is attached to attachment surface 161, which is one surface of barrier wall part 16. Moreover, attachment component 32, reflective component 40, optical lens 50, light distributor 60, and light control component 700 are disposed in the listed order along the X axis positive direction, in front space 121.

Lamp body 10 includes, in front space 121, light blocking part 14. Light blocking part 14 stands on attachment surface 161 and surrounds the perimeter of light source 30. In this embodiment, light blocking part 14 extends from attachment surface 161 in the X axis positive direction and surrounds the perimeter of light source 30. Light blocking part 14 inhibits light emitted from light source 30 that has leaked through the gap between reflective component 40 and attachment surface 161 (or light source 30) from further leaking into the space between tubular part 11 of lamp body 10 and reflective component 40. This inhibits light from leaking from the space between tubular part 11 and reflective component 40 in the X axis positive direction of lighting device 1.

Moreover, as illustrated in FIG. 2 and FIG. 3, lamp body 10 includes, in front space 121, front fins 15 that are shaped like fins and integrally formed with at least one of barrier wall part 16 and tubular part 11. Heat is conducted from at least one of barrier wall part 16 and tubular part 11 to front fins 15, and front fins 15 function to dissipate the conducted heat. In this embodiment, front fins 15 are integrally formed with both tubular part 11 and barrier wall part 16. With this, heat generated by light source 30 is efficiently conducted to tubular part 11 from barrier wall part 16 via front fins 15. Moreover, front fins 15 are disposed so as to not protrude out of lamp body 10 from front space 121. This makes it possible to inhibit a textured surface from being formed on exposed surfaces of lighting device 1.

Barrier wall part 16 of lamp body 10 defines insertion hole 162 and two through holes. Insertion hole 162 is a hole formed in barrier wall part 16 for inserting lead wire 92 for supplying power to light source 30 from a power supply circuit in power supply box 90. The inner diameter of insertion hole 162 is approximately equal to the outer diameter of lead wire 92. This makes it possible to inhibit light from leaking into rear space 122 from insertion hole 162.

The through holes are for fixing arm support pedestal 20 that supports arm 70 to barrier wall part 16. Barrier wall part 16 is fixed to arm support pedestal 20 as a result of the two screws 26 illustrated in FIG. 2 passing through the through holes and being screwed into screw holes formed in the front (Z axis positive direction side) end of arm support pedestal 20.

Lamp body 10 includes, in rear space 122, rear fins 17 that are shaped like fins and integrally formed with at least one of tubular part 11 and barrier wall part 16. Rear fins 17 are disposed so as to not protrude out of lamp body 10 from rear space 122. Moreover, at least two of rear fins 17 are provided standing in the vicinity of insertion hole 162 through which lead wire 92 passes. The position of lead wire 92 is restricted by rear fins 17 standing in positions on either side of insertion hole 162 along the X axis, in the vicinity of insertion hole 162. This makes it possible to easily arrange lead wire 92 in a predetermined position. Moreover, when inserting lead wire 92 into arm 70, since the position of lead wire 92 is restricted, lead wire 92 can be easily inserted. The function of the positional restriction of lead wire 92 will be discussed later.

Lamp body 10 is made of a metal material. In this embodiment, lamp body 10 may be formed by, for example, an aluminum die cast process. The color of the outer surface of lamp body 10 may be selected according to the application of lighting device 1. In this embodiment, lamp body 10 is painted white.

(1-2. Light Source)

As illustrated in FIG. 2, light source 30 includes solid-state light-emitting elements. Light source 30 is disposed inside lamp body 10. The light emitted by light source 30 emits from lighting device 1 as emission light. In this embodiment, light source 30 is a light-emitting module including light-emitting diodes (LEDs), and is an LED light source that radially emits a predetermined light. Light source 30 is configured to emit, for example, white light. Light source 30 is configured of chip-on-board (COB) type LEDs, and includes substrate 302, LEDs 304 which are bare chips (LED chips) mounted on substrate 302, and a phosphor-containing sealant that seals LEDs 304. Note that in this embodiment, the sealant collectively seals all LEDs 304, but the configuration of the sealant is not limited to this example. For example, sealant may be applied in a plurality of lines each corresponding to one row of LEDs 304 arranged in lines.

Light source 30 is attached to attachment surface 161 of barrier wall part 16. In lighting device 1 illustrated in the figures, optical axis J of light source 30 corresponds to the X axis in the figures.

Substrate 302 is a mounting substrate for mounting LEDs 304, and, for example, is a ceramic substrate, resin substrate, or metal-based substrate covered in an insulating film. Moreover, substrate 302 has, for example, a flat, rectangular shape in a plan view, and is fixed in place as a result of the bottom surface of substrate 302 (the surface on the X axis negative direction side in FIG. 2) being attached to attachment surface 161 of barrier wall part 16. Although not illustrated in the drawings, note that a pair of electrode terminals (positive and negative electrode terminals) are formed on substrate 302 for receiving DC power from an external source for causing LEDs 304 (light source 30) to emit light.

(1-3. Attachment Component)

Attachment component 32 is for attaching light source 30 to barrier wall part 16. Attachment component 32 includes restrictor part 322 and locking parts 324.

Restrictor part 322 restricts the position of light source 30 in a direction perpendicular to optical axis J of light source 30 (i.e., position in a direction parallel to Y and Z axes). Restrictor part 322 has a rectangular frame-like shape that defines opening 323 (central opening 323) in the center thereof. Opening 323 defined in the center of restrictor part 322 has a shape that corresponds to light source 30, and light source 30 is disposed so as to be exposed via opening 323.

Moreover, attachment component 32 is disposed on attachment surface 161 of barrier wall part 16, and fixed to barrier wall part 16 by two connection components 36 and two screws 38. With this, attachment component 32 and light source 30 disposed in central opening 323 of attachment component 32 are fixed to barrier wall part 16.

Locking parts 324 are talon shaped components that support reflective component 40 and engage with lock-receiving parts of reflective component 40. In this embodiment, attachment component 32 includes two locking parts 324. Each locking part 324 is an approximately L-shaped part having, on an end thereof an inclined surface (protrusion) that protrudes in a direction away from optical axis J that inserts into a corresponding one of the lock-receiving parts to thereby engage locking part 324 with the lock-receiving part.

For example, attachment component 32 can be formed using a resin material, such as polybutylene terephthalate (PBT) or polycarbonate.

(1-4. Connection Components)

Connection components 36 are components to which wires (not illustrated in the drawings) for supplying current to light source 30 are connected. Lighting device 1 according to this embodiment includes two connection components 36. A high potential wire is connected to one connection component 36, and a low potential wire is connected to the other connection component 36. An electrode (not illustrated in the drawings) for supplying current to light source 30 is provided on each connection component 36. The electrodes are connected to electrode terminals formed on light source 30.

Moreover, connection components 36 have a function of restricting the position of light source 30. Each connection component 36 defines a through hole through which screw 38 passes, and screws 38 inserted through the through holes fix connection components 36 to barrier wall part 16 and attachment component 32. Here, the position of light source 30 along the optical axis is restricted by portions of connection components 36 near the optical axis J pressing down on light source 30 toward barrier wall part 16.

The main frame of connection components 36 can be formed using a resin material, such as PBT or polycarbonate. Moreover, the electrodes on connection components 36 can be formed using an electrically conductive material such as copper.

(1-5. Reflective Component)

Reflective component 40 controls the distribution of light from light source 30. In this embodiment, reflective component 40 reflects light from light source 30 toward optical lens 50. Reflective component 40 has an approximate tubular shape with an opening through which optical axis J passes.

Reflective component 40 includes housing part 401 and frame part 405.

Housing part 401 has the approximate shape of a bowl whose inner diameter gradually increases in size from the end in the X axis negative direction toward the end in the X axis positive direction. Housing part 401 defines front opening 409 at the front and has a bottom in the rear. Rear opening 403 through which optical axis J passes is defined in the central region of bottom part 402 of housing part 401.

Frame part 405 has a tubular shape that extends in the X axis negative direction from the inner circumferential edge of bottom part 402. Frame part 405 defines rear opening 403 that opens facing the X axis. Frame part 405 gradually narrows in the X axis negative direction so as to reflect light from light source 30 toward optical lens 50.

The lock-receiving parts that engage with locking parts 324 of attachment component 32 are formed on the outer circumference side of reflective component 40. The lock-receiving parts are holes formed in components standing on the outer circumference side of reflective component 40. The lock-receiving parts engage with locking parts 324 to lock reflective component 40 to attachment component 32. This attaches reflective component 40 to barrier wall part 16 via attachment component 32.

Three locking parts 410 are provided on the light emission end of reflective component 40. Locking parts 410 are talon shaped components that engage with optical lens 50.

For example, reflective component 40 can be formed using a hard, white resin material, such as polybutylene terephthalate (PBT).

(1-6. Optical Component)

As illustrated in FIG. 2 and FIG. 3, optical lens 50 is a light-transmissive component that includes entrance surface 510 through which light from reflective component 40 enters, and exit surface 520 through which light that has entered through entrance surface 510 exits. Optical lens 50 may have a function of transmitting and controlling the distribution of light incident from reflective component 40. In this embodiment, optical lens 50 is a Fresnel lens. This makes it possible for lighting device 1 to focus the emission light and form a spot-shaped illuminated region.

Three lock-receiving parts 530 are provided on the circumferential edge of optical lens 50. In this embodiment, lock-receiving parts 530 are recesses in the outer circumference side of optical lens 50. Lock-receiving parts 530 of optical lens 50 engage with locking parts 410 of reflective component 40 to lock optical lens 50 to reflective component 40. This attaches optical lens 50 to barrier wall part 16 via reflective component 40 and attachment component 32. Moreover, since optical lens 50 is disposed on the light emission end of reflective component 40, light emitted from reflective component 40 can efficiently enter optical lens 50.

Optical lens 50 is formed using a light-transmissive material, and may be formed using a transparent resin material such as PMMA (acryl) or polycarbonate, or a transparent material such as glass.

(1-7. Light Distributor)

Light distributor 60 is a disc-shaped, light-transmissive light distribution control component. Light distributor 60 has a function of transmitting and controlling the distribution of light incident from optical lens 50. The outer diameter of light distributor 60 is approximately equal to the outer diameter of optical lens 50. Light distributor 60 is disposed further in the X axis positive direction than optical lens 50, and is approximately parallel to optical lens 50. In other words, light distributor 60 is disposed on the light emission side of light source 30. In this embodiment, there is a gap between light distributor 60 and optical lens 50, but light distributor 60 and optical lens 50 may be disposed in close contact with one another so as to be gapless. Light distributor 60 includes entrance surface 610 through which light from optical lens 50 enters, and exit surface 620 through which light that has entered through entrance surface 610 exits.

Entrance surface 610 is located on the X axis negative direction side of light distributor 60, and opposes exit surface 520 of optical lens 50. Exit surface 620 is located on the X axis positive direction side of light distributor 60. At least one of entrance surface 610 and exit surface 620 includes a plurality of dispersed concave regions 630 each including a smooth concave surface. In this embodiment, concave regions 630 are arranged in a matrix in entrance surface 610, and each concave region 630 is an approximate semispherical recess. Note that concave regions 630 are preferably uniformly arranged, but may be randomly arranged.

As illustrated in FIG. 4 and FIG. 5, in a plan view, each concave region 630 is approximately circular in shape, and in a cross section taken approximately parallel to optical axis J of light source 30, each concave region 630 has an approximate arc shape. In other words, each concave region 630 is approximately semispherical. When the radius of concave region 630 is defined as R, the center point that defines the approximate arc is defined as O, the distance from line H, which is perpendicular to entrance surface 610 in which concave region 630 is formed and passes through center point O, to perimeter P of concave region 630 is defined as d, and the acute angle between (i) line L that connects center point O and perimeter P of concave region 630 and (ii) line H is defined as α, angle α can be expressed as in Equation 1.

[MATH. 1]

$$\alpha = \arctan\left(\frac{d}{\sqrt{R^2 - d^2}}\right) \quad \text{Equation 1}$$

Equation 2 is derived from the Pythagorean Theorem and Equation 1.

[MATH. 2]

$$\alpha = \arctan\left(\frac{2dD}{(d^2 - D^2)}\right) \quad \text{Equation 2}$$

Moreover, when Equations 1 and 2 are satisfied, angle α satisfies the conditions in Expression 3.

[MATH. 3]

$$10° < \arctan\left(\frac{2dD}{(d^2 - D^2)}\right) < 50° \quad \text{Expression 3}$$

When angle α satisfies Expression 3, it is within a range that allows for a desired light distribution control.

Moreover, distance d satisfies Expression 4. Distance d may satisfy Expression 5 in particular.

[MATH. 4]

$$0.05 \leq d \leq 5 \text{ (mm)} \quad \text{Expression 4}$$

[MATH. 5]

$$0.05 \leq d \leq 0.5 \text{ (mm)} \quad \text{Expression 5}$$

Arithmetical mean roughness Ra of the concave surface of each concave region 630 is at most 1 μm. More specifically, arithmetical mean roughness Ra is derived by calculating a mean line from the roughness curve of concave region 630, extracting a reference length in the direction of the mean line, summing absolute values of deviation from a mean line of the extracted portion to a measurement curve, and calculating the mean. When the roughness curve is expressed as y=f(x) where the direction of the mean line of the extracted portion is the X axis and the Y axis is the direction perpendicular to the X axis, arithmetical mean roughness Ra is represented by Equation 6. Arithmetical mean roughness Ra is stipulated in detail in JIS B0601-2001.

[MATH. 6]

$$R_a = \frac{1}{L}\int_0^L |f(x)|dx \qquad \text{Equation 6}$$

In a plan view of light distributor 60, as illustrated in FIG. 6, when the dot diameter of each concave region 630 is expressed as A, the inter-dot distance between two adjacent concave regions 630 is expressed as B, and the dot superimposition rate is expressed as T, Equation 7 is satisfied. Inter-dot distance B is the distance between the centers of two adjacent concave regions 630 in a plan view. Note that in FIG. 6, dot superimposition rate T is exemplified as being 111%.

[MATH. 7]

$$T = \left(\frac{A}{B}\right) \qquad \text{Equation 7}$$

Figure 7:
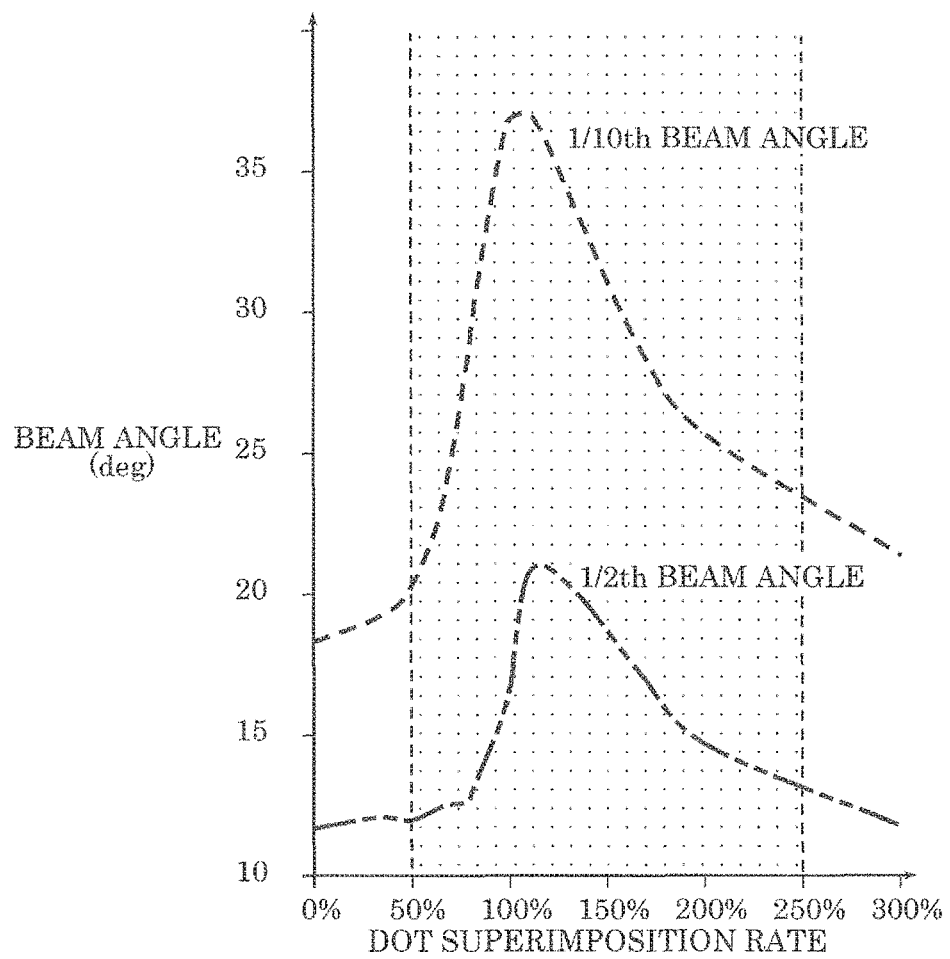
FIG. 7 illustrates the relationship between the dot superimposition rate and the beam angle in the lighting device according to the embodiment.

FIG. 7 illustrates the relationship between the dot superimposition rate and the beam angle in lighting device 1 according to the embodiment. In FIG. 7, the line drawn with two short dashes and one long dash indicates a ½ beam angle, and the line drawn with short dashes indicates a $\frac{1}{10}^{th}$ beam angle. A hybrid Fresnel lens is used for optical lens 50, the distance between optical lens 50 and light distributor 60 is 3 mm, dot diameter A of concave region 630 is 0.2 mm, and angle α of concave region 630 is 30 degrees. Note that a ½ beam angle is an angle at which the intensity of the light emitted by lighting device 1 is half the central intensity. A $\frac{1}{10}^{th}$ beam angle is an angle at which the intensity of the light emitted by lighting device 1 is $\frac{1}{10}^{th}$ the central intensity.

Here, the result of the simulation shows that, in ½ and $\frac{1}{10}^{th}$ beam angles, when dot superimposition rate T of two adjacent concave regions 630 is at least 50% and at most 250%, the beam angle increases. In particular, the result of the simulation shows that, in ½ and $\frac{1}{10}^{th}$ beam angles, the beam angle peaks when dot superimposition rate T is approximately 111%. Note that even when dot superimposition rate T is less than 100%, two adjacent concave regions 630 are still defined as being "superimposed".

As illustrated in FIG. 2 and FIG. 4, light distributor 60 is attachable to and detachable from lighting device 1. More specifically, lock-receiving parts 640 are provided on the circumferential edge of light distributor 60. In this embodiment, lock-receiving parts 640 comprise three recesses in light distributor 60. Lock-receiving parts 640 of light distributor 60 engage with locking parts formed on the inside of light control component 700 to lock light distributor 60 to light control component 700. This attaches light distributor 60 to barrier wall part 16 via light control component 700. Moreover, since light distributor 60 is disposed on the light entrance end of light control component 700, the light emitted from optical lens 50 efficiently enters light distributor 60.

Note that in this embodiment, distance d is defined with respect to a single concave region 630. When the concave region 630 dot superimposition rate exceeds 100%, it is conceivable that the position of perimeter P of concave region 630 will change, but distance d should not be interpreted this way. Even in such a case, when looking at a single concave region 630, even if that virtual concave region 630 includes a region superimposed with an adjacent concave region 630, as illustrated by dot diameter A in FIG. 6, perimeter P is defined as the perimeter of the virtual concave region 630.

Note that in this embodiment, light distributor 60 is provided at, but not limited to, the X axis negative direction end of light control component 700. For example, light distributor 60 may be attached to reflective component 40, optical lens 50, or tubular part 11. In other words, so long as light distributor 60 is attachable to and detachable from lighting device 1, light distributor 60 may be provided on the outside of light control component 700, and a combination of known configurations may be used for the attachment thereof. Accordingly, attachment is not limited to lock-receiving parts 640 of light distributor 60 and locking parts formed on the inside of light control component 700.

Light distributor 60 is formed using a light-transmissive material, and may be formed using a transparent resin material such as PMMA (acryl) or polycarbonate, or a transparent material such as glass.

(1-8. Light Control Component)

As illustrated in FIG. 2 and FIG. 3, light control component 700 includes entrance opening 710 through which light from light distributor 60 enters and exit opening 720 through which light that has passed through light distributor 60 exits. Light control component 700 is an approximately tubular component disposed inside lamp body 10, on the exit surface 520 side of optical lens 50. Light control component 700 is a separate component from lamp body 10.

Light control component 700 is disposed such that optical axis J passes through entrance opening 710 and exit opening 720. Moreover, the outer diameter of exit opening 720 of light control component 700 is approximately equal to the inner diameter of front opening 111 of lamp body 10. This inhibits a reduction in the region through which emission light passes through front opening 111 of lamp body 10 caused by light control component 700. This also inhibits emission light from leaking from between lamp body 10 and light control component 700.

Light control component 700 is disposed such that exit opening 720 is located in the vicinity of front opening 111 of lamp body 10. Moreover, the length of light control component 700 along the optical axis J (X axis) is approximately equal to the distance from exit surface 520 of optical lens 50 to front opening 111 of lamp body 10. With this, light control component 700 covers the region of the inner surface of lamp body 10 from the vicinity of exit surface 520 of optical lens 50 to the vicinity of front opening 111 of lamp body 10. Here, the inner surface (optical axis J side surface) of light control component 700 is a black anti-glare surface. Accordingly, the inner surface in the vicinity of front opening 111 of lamp body 10 is covered by the inner surface of light control component 700, which is a black anti-glare surface. This inhibits glare on the inner surface in the vicinity of front opening 111 of lamp body 10.

So long as the inner surface of light control component 700 is a black anti-glare surface, the surface is not particular limited in other aspects. The black anti-glare surface can be produced by, for example, deglossing the painted black surface. The black anti-glare surface can also be produced by sandblasting a surface that is painted black or made of a black material. In order to further inhibit glare on the inner surface of light control component 700, a stepped structure (baffle) may be formed on the inner surface of light control component 700.

Light control component 700 includes, on its outer perimeter, lock-receiving parts 760. Light control component 700 is held inside lamp body 10 by lock-receiving parts 760 engaging with locking parts 114. In this embodiment, lock-receiving parts 760 are protrusions that engage with locking parts 114, which are recesses. This makes it possible to easily attach light control component 700 simply by inserting light control component 700 into front opening 111 of lamp body 10. Accordingly, with lighting device 1 according to this embodiment, compared to when the inner and outer surfaces of lamp body 10 are painted with different colors, it is easier to for a black anti-glare surface on the inner surface of lamp body 10.

For example, light control component 700 can be formed using a resin material, such as polycarbonate or PBT. This makes it possible to form light control component 700 using a resin material, which makes it possible to manufacture light control component 700 easily and at low cost.

(1-9. Arm Support Pedestal)

Arm support pedestal 20 is a component that supports arm 70. Arm support pedestal 20 is fixed to lamp body 10 in rear space 122. In this embodiment, arm support pedestal 20 is fixed to the rear space 122 side of barrier wall part 16.

Arm support pedestal 20 includes heat dissipater 28 thermally connected to lamp body 10, and arm support part 242 coupled to the lower end of arm 70. As described above, in this embodiment, arm support pedestal 20 is fixed to barrier wall part 16 of lamp body 10. This gives heat dissipater 28 of arm support pedestal 20 the function of dissipating heat generated by light source 30. In this embodiment, heat dissipater 28 is disposed on the X axis negative direction of arm support pedestal 20. Heat dissipater 28 has an exposed surface that is exposed to the outside and has protrusions and depressions. In this embodiment, heat dissipater 28 has an approximately discus shape. A plurality of grooves extending along the Z axis are formed on the surface that is exposed to the outside. The grooves increase the surface area of heat dissipater 28 and thus increase the heat dissipating rate.

Heat dissipater 28 closes rear opening 112, which is the opening on the rear space 122 side of lamp body 10. As a result of heat dissipater 28 closing rear opening 112, rear fins 17, lead wire 92, etc., disposed in rear space 122 of lamp body 10 can be prevented from being seen from outside. Note that "closes" does not necessarily mean completely closes. For example, a gap needed to insert heat dissipater 28 (in other words, in this embodiment, arm support pedestal 20) through rear opening 112 may be provided between heat dissipater 28 and rear opening 112. Moreover, heat dissipater 28 may cover rear opening 112 to an extent that the inside of rear space 122 of lamp body 10 is, for the most part, not visible.

Moreover, the surface of heat dissipater 28 facing outside rear space 122 has depressions and protrusions, and is disposed inside on the rear space 122 side.

Arm support part 242 supports arm 70. In this embodiment, arm support part 242 has an approximately semicircular cross section that corresponds to the shape of second end 74 of arm 70.

As illustrated in FIG. 1 and FIG. 2, arm 70 has one end (in the Z axis positive direction) connected to power supply box 90, and another end (in the Z axis negative direction) connected to lamp body 10. Arm 70 includes a columnar rotational axis part that protrudes in opposite directions. In this embodiment, the rotational axis part is a columnar component that extends in directions perpendicular to the optical axis J and the up and down directions of arm 70. Arm 70 is rotatably attached to arm support pedestal 20 by being held between a flat spring and arm support part 242 of arm support pedestal 20. In other words, arm 70 attaches to lamp body 10 via arm support pedestal 20. Arm 70 is disposed in side opening 113 formed in the side surface of tubular part 11.

Arm support pedestal 20 is made of a metal material. In this embodiment, arm support pedestal 20 may be formed by, for example, an aluminum die cast process. The color of the outer surface of arm support pedestal 20 may be selected according to the application of lighting device 1. In this embodiment, just like lamp body 10, arm support pedestal 20 is painted white.

(1-10. Arm)

As illustrated in FIG. 2 and FIG. 3, arm 70 has first end 73 connected to power supply box 90, and second end 74 connected to lamp body 10. In this embodiment, arm 70 includes arm main body 72, first end 73, and second end 74. Second end 74 includes an approximately columnar rotational axis part that protrudes in opposite directions. In this embodiment, second end 74 includes the approximately columnar rotational axis part that extends in directions perpendicular to the optical axis J and the lengthwise direction of arm 70. Arm 70 is rotatably attached to arm support pedestal 20 by second end 74 of arm 70 being held between flat spring 80 and arm support part 242 of arm support pedestal 20. In other words, in this embodiment, arm 70 attaches to lamp body 10 via arm support pedestal 20. Arm 70 is disposed in side opening 113 formed in the side surface of tubular part 11. In other words, arm 70 is inserted from the outside into lamp body 10 via side opening 113.

Hereinafter, the configuration of arm 70 will be described in detail with reference to FIG. 3.

As illustrated in FIG. 3, arm 70 has first end 73 connected to power supply box 90 and second end 74 inside lamp body 10, and inside arm 70, insertion hole 76 is formed in the lengthwise direction of arm 70. Lead wire 92 is inserted into insertion hole 76, and power is supplied to light source 30 from power supply box 90 via lead wire 92. In this way, lead wire 92 is inhibited from being damaged since lead wire 92 is not exposed to the outside.

Arm 70 is made of a metal material. In this embodiment, arm 70 may be formed by, for example, an aluminum die cast process.

(1-11. Flat Spring)

Flat spring 80 is an elastic component for rotatably attaching arm 70 to arm support pedestal 20. In this embodiment, flat spring 80 is C-shaped, as illustrated in FIG. 3, and is fixed to arm support pedestal 20 via screws 86 and 88 in a state in which second end 74 of arm 70 is between flat spring 80 and arm support pedestal 20. This attaches arm 70 to arm support pedestal 20.

Since second end 74 of arm 70 is between flat spring 80 and arm support pedestal 20, arm 70 is rotatable about second end 74 relative to arm support pedestal 20. Moreover, the torque required to rotate arm 70 is adjustable by adjusting the extent that screw 88, which fixes flat spring 80 to arm support pedestal 20, is screwed down. When lighting device 1 is in an assembled state, screw 88 is disposed in a position such that screw 88 can be adjusted with a screw driver from side opening 113 of lamp body 10. This allows a user to adjust the torque required to rotate arm 70 without having to take apart lighting device 1.

Flat spring 80 is made of a metal material. In this embodiment, flat spring 80 may be made of, for example, iron.

(1-12. Power Supply Box)

As illustrated in FIG. 1 and FIG. 2, power supply box 90 is a housing that houses a power supply circuit for supplying power to light source 30. In this embodiment, the power supply circuit inside power supply box 90 converts AC power supplied from a source external to power supply box 90 into DC power, and supplies to the DC power to LEDs 304 of light source 30 via lead wire 92.

The outer wall part of power supply box 90 is made of a metal or resin material. In this embodiment, the outer wall part is made of, for example, aluminum.

(2. Lighting Device)

The distribution of light achieved with lighting device 1 will be described with reference to FIG. 8 through FIG. 10.

FIG. 8 illustrates the relationship between angles of concave region 630, beam angles, and light usage efficiency in lighting device 1 according to the embodiment. FIG. 9 illustrates the relationship between concave region 630, beam angles, and light usage efficiency in lighting device 1 according to the embodiment. The beam angles in FIG. 8 and FIG. 9 are ½ beam angles.

In FIG. 8 and FIG. 9, the thickness of light distributor 60 is 2 mm, and the superimposition rate is 110%. In FIG. 8, reflective component 40 having a reflectivity of 80% is used, and in FIG. 9, reflective component 40 having a reflectivity of 70% is used.

In FIG. 8, a typical Fresnel lens is used as optical lens 50. The dotted and dashed line represents a graph of the relationship between concave region 630 and the ½ beam angle, and the two short dashes and one long dashed line represents a graph of the relationship between concave region 630 and light usage efficiency. Both graphs are simulated results. The square icons indicate results from actual experiments, and illustrate the relationship between concave region 630 and the ½ beam angle. The diamond icons also indicate results from actual experiments, and illustrate the relationship between concave region 630 and light usage efficiency. Note that when angle α of concave region 630 is 0, the light usage efficiency is 1 (100%).

In FIG. 9, a hybrid Fresnel lens is used as optical lens 50. The dotted and dashed line represents a graph of the relationship between concave region 630 and the ½ beam angle, and the two short dashes and one long dashed line represents a graph of the relationship between concave region 630 and light usage efficiency. Both graphs are simulated results. The square icons indicate results from actual experiments, and illustrate the relationship between concave region 630 and the ½ beam angle. The diamond icons also indicate results from actual experiments, and illustrate the relationship between concave region 630 and light usage efficiency. Note that when angle α of concave region 630 is 0 degrees, the light usage efficiency is 1 (100%).

In FIG. 8 and FIG. 9, the results show that, even when different lenses are used, angle α is preferably in a range of from 10 degrees to 50 degrees, inclusive. A significant difference appears in the ½ beam angle between an angle α in a range of from 10 degrees to 50 degrees, inclusive, and an angle α of 0 degrees (i.e., when concave region 630 is not formed). When an optical component that has been, for example, sandblasted is used, there is a chance that light usage efficiency may be 0.9 or less. With light distributor 60 according to this embodiment, since angle α is in a range of from 10 degrees to 50 degrees, inclusive, and the light usage efficiency is at least 0.9, it can be said that the light usage efficiency is high.

FIG. 10 is a conceptual diagram illustrating the relationship between concave regions 630 of light distributor 60 according to this embodiment and emitted light. FIG. 10 illustrates the emitted light, the prism angle in the X axis direction (one example of the major axis), the prism angle in the Y axis direction, and the ½ beam angle for different cases pertaining to concave regions 630, including a case where concave regions 630 are not formed and cases where the dot superimposition rate of concave regions 630 are gradually increased. In other words, in FIG. 10, the dot superimposition rate increases along the X axis direction.

As illustrated in FIG. 10, in light distributor 60 in which concave regions 630 are not formed, the X axis direction angle α and the Y axis direction angle α are 0 degrees, and the ½ beam angle is 10 degrees×10 degrees. In concave region 630, when the X axis direction angle α is 25 degrees and the Y axis direction angle α is 15 degrees, the ½ beam angle is 16 degrees×11 degrees. In concave region 630, when the X axis direction angle α is 30 degrees and the Y axis direction angle α is 10 degrees, the ½ beam angle is 21 degrees×10 degrees. In concave region 630, when the X axis direction angle α is 45 degrees and the Y axis direction angle α is 10 degrees, the ½ beam angle is 27 degrees×13 degrees. In concave region 630, when the X axis direction angle α is 70 degrees and the Y axis direction angle α is 0 degrees, the ½ beam angle is 40 degrees×9 degrees.

In this way, the results show that the greater the anisotropic property (aspect ratio) of the X axis direction angle α and the Y axis direction angle α is (in this embodiment, the X axis direction angle α is larger than the Y axis direction angle α), the larger the X axis direction ½ beam angle is. Note that when the Y axis direction angle α is larger than the X axis direction angle α, the Y axis direction ½ beam angle increases. In other words, by changing the anisotropic property of the X axis direction angle α and the Y axis direction angle α, it is possible to control anisotropic light distribution.

(3. Light Distributor Manufacturing Method)

Next, the manufacturing method of light distributor 60 will be described with reference to FIG. 11.

Figure 11:
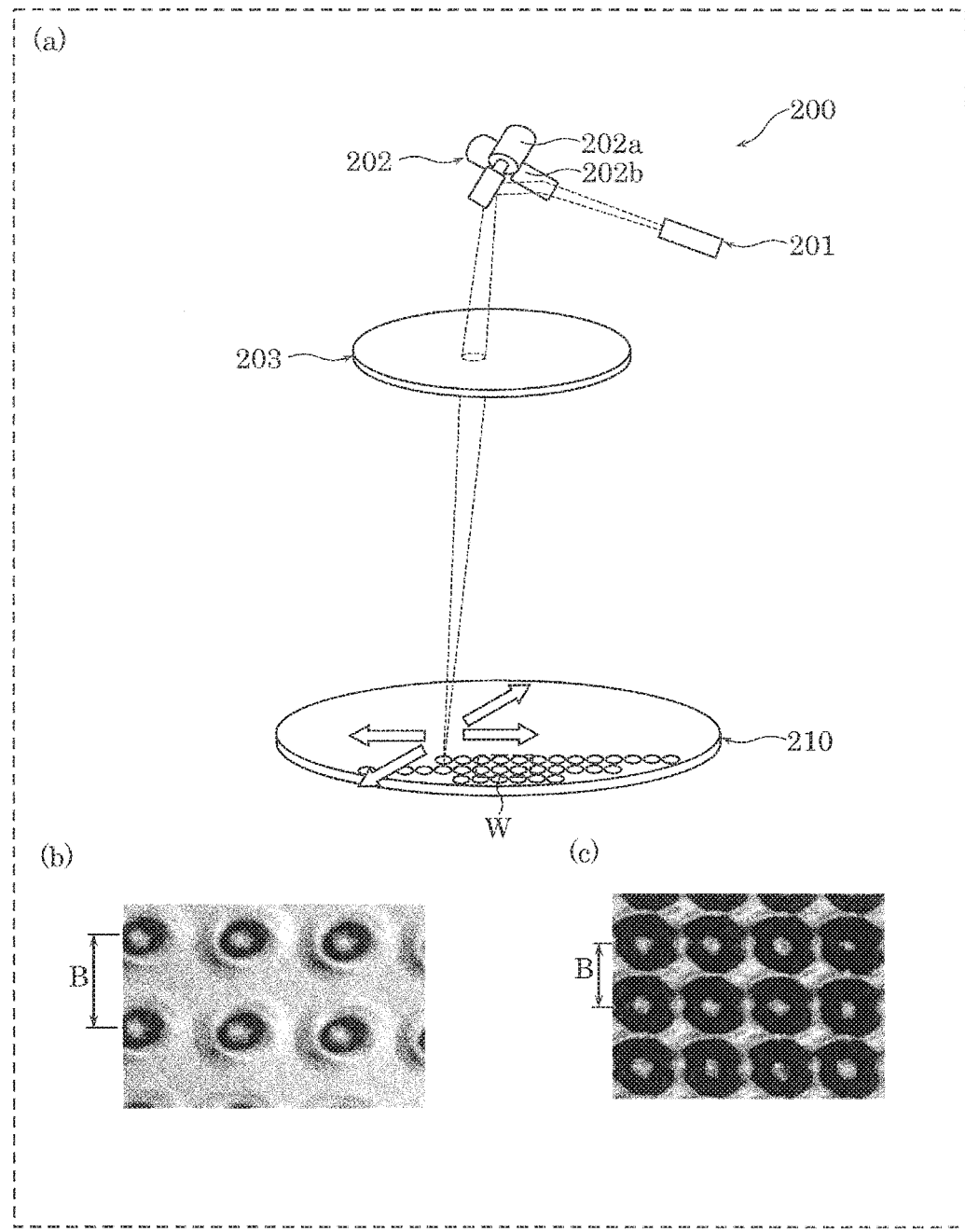
In FIG. 11, (a) illustrates a conceptual diagram illustrating a process in the manufacturing of the light distributor according to the embodiment.

In FIG. 11, (a) illustrates a conceptual diagram illustrating a process in the manufacturing of light distributor 60 according to the embodiment. In FIG. 11, (b) and (c) are plan views of concave regions 630 formed in workpiece 210.

As illustrated in (a) in FIG. 11, in the manufacturing of light distributor 60, as one example, laser fabrication device 200 is used. Preparations are made in workpiece 210 in order to produce light distributor 60. Laser fabrication device 200 includes laser light source 201, galvanometer scanner 202, and fθ lens 203.

Laser light source 201 is configured to emit a laser toward galvanometer scanner 202 upon receiving an instruction from a controller.

Galvanometer scanner 202 includes two galvanometers 202a and two galvanometer mirrors 202b. The two galvanometers 202a and the two galvanometer mirrors 202b are provided in one to one correspondence. Galvanometers 202a are devices that position the laser on a target, and turns on and off the laser light from laser light source 201 via a controller. Moreover, galvanometers 202a include servo drivers for controlling operation of galvanometer mirrors 202b, and the servo drivers control the orientation of galvanometer mirrors 202b upon receiving an instruction from the controller. Galvanometer mirrors 202b are mirrors that reflect laser light, and for example, are beryllium mirrors including beryllium as a material.

fθ lens 203 is a lens having the relationship Y=fθ, where Y is the image height proportional to a laser light angle of incidence θ, and f is focal distance. fθ lens 203 is disposed above workpiece 210 placed on a pedestal. Image height Y is, for example, when workpiece 210 is a disc, approximately the radius of the disc. In other words, laser fabrication device 200 can perform fabrication up to the edge of workpiece 210.

Laser light emitted by laser light source 201 is reflected by galvanometer mirrors 202b toward fθ lens 203. fθ lens 203 is capable of focusing laser light incident thereon such that the focal point of the laser light deflected by galvanometer mirrors 202b of galvanometer scanner 202 is distributed in the same plane.

In laser fabrication device 200, since laser light is focused in the same plane regardless of the angle of incidence, laser light is focused approximately perpendicular to the surface of the target, making it possible to accurately fabricate workpiece 210. Since the servo driver is controlled by a controller, it is possible to freely change the angle of galvanometer mirrors 202b to any angle about the rotational axis. With this, the laser light emitted onto galvanometer mirrors 202b is scanned in a light emission plane of workpiece 210 in any direction (concave region forming step). Stated differently, in the concave region forming step, a plurality of dispersed concave regions 630 each including a smooth concave surface are formed by emitting the laser light onto workpiece 210 and scanning the focus point of the laser light. This produces light distributor 60.

In (b) and (c) in FIG. 11, as one example, concave regions 630 formed in workpiece 210 using laser fabrication device 200 are illustrated. When the output of laser light source 201 is 3 W, the distance between fθ lens 203 and workpiece 210 is 150 mm, the scanning speed of the laser light emitted onto workpiece 210 is 1,200 m/s, and the frequency of the laser light is 5 kHz, as illustrated in (b) in FIG. 11, light distributor 60 including concave regions 630 arranged at an inter-dot distance B of 240 μm is produced.

When the output of laser light source 201 is 4 W, the distance between fθ lens 203 and workpiece 210 is 150 mm, the scanning speed of the laser light emitted onto workpiece 210 is 900 m/s, and the frequency of the laser light is 5 kHz, as illustrated in (b) in FIG. 11, light distributor 60 including concave regions 630 arranged at an inter-dot distance B of 180 μm is produced.

From these results, inter-dot distance B can be expressed as in Equation 8, where S is the scanning speed of the laser light emitted onto workpiece 210 and F is the frequency of the laser light.

[MATH. 8]

$$B = \left(\frac{S}{F}\right) \quad \text{Equation 8}$$

Accordingly, inter-dot distance B is determined by the relationship between the laser light frequency and scanning speed. Moreover, angle α and the diameter of concave region 630 are determined by the relationship between the output of laser light source 201 and the distance between fθ lens 203 and workpiece 210.

Note that if the speed of the changes in the angle of galvanometer mirrors 202b is reduced, a groove having the shape of a partial approximate column in a plan view is produced, such as concave region 630 illustrated in (d) in FIG. 10, and if the speed is increased, the side surface of concave region 630 undulates, such as concave regions 630 in (c) and (b) in FIG. 10, and if the speed is further increased, concave region 630 takes on an approximate semispherical shape, as illustrated in (a) in FIG. 10.

(4. Arithmetical Mean Roughness of Concave Region of Light Distributor)

Next, arithmetical mean roughness Ra of concave region 630 of light distributor 60 will be described.

Figure 12:
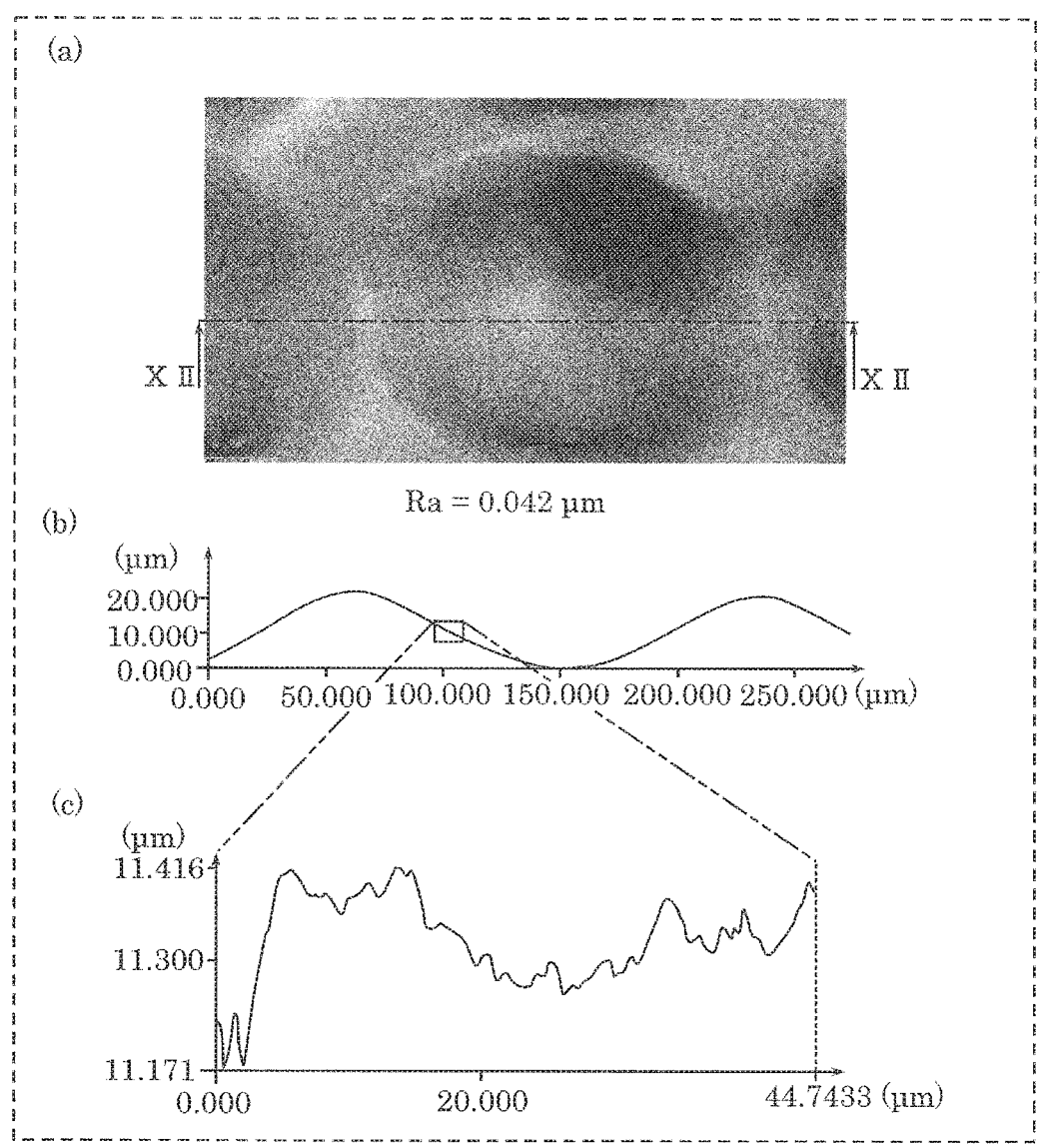
In FIG. 12, (a) is an enlarged plan view of a section of a concave region of the light distributor according to the embodiment.

In FIG. 12, (a) is an enlarged plan view of a section of concave region 630 of light distributor 60 according to the embodiment. In FIG. 12, (b) is a graph of the profile roughness of concave region 630 of light distributor 60 according to this embodiment, taken at line XII-XII through concave region 630 in (a) in FIG. 12. In FIG. 12, (c) is an enlarged view of the section surrounded by the square in (b) in FIG. 12.

In FIG. 12, (a) is a plan view of an actual light distributor 60 including concave regions 630 formed using laser fabrication device 200 in FIG. 11. Arithmetical mean roughness Ra in (c) in FIG. 12 is calculated as 0.042 μm using Equation 6. This arithmetical mean roughness Ra does not exceed 1 μm. If arithmetical mean roughness Ra is at most 1 μm, concave region 630 has a smooth curved surface, as illustrated in (b) in FIG. 12.

Since this concave region 630 has a smooth curved surface, light distribution is easily controlled. Moreover, the light usage efficiency is not likely to decrease when the light incident on the concave region is reflected.

(5. Comparative Example of Arithmetical Mean Roughness of Concave Region of Light Distributor)

Next, a comparative example of forming concave regions using laser fabrication device 200 in FIG. 11 will be given. In this comparative example, the laser fabrication is performed using workpiece 210, which is different from the workpiece used for light distributor 60.

Figure 13:
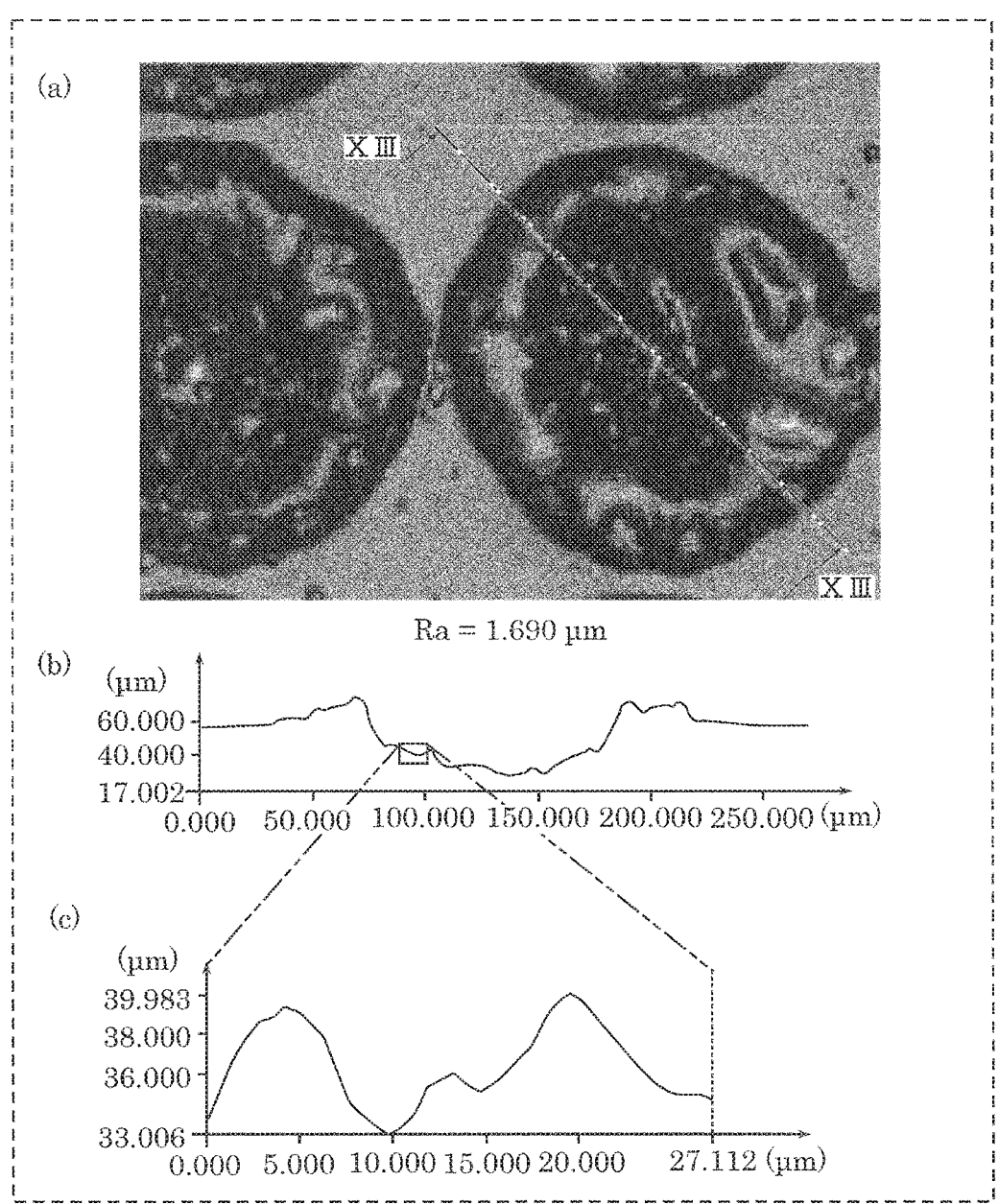
In FIG. 13, (a) is an enlarged plan view of a section of a concave region of a light distributor according to the comparative example.

In FIG. 13, (a) is an enlarged plan view of a section of a concave region of a light distributor according to the comparative example. In FIG. 13, (b) is a graph of the profile roughness of a concave region of the light distributor according to the comparative example, taken at line XIII-XIII through the concave region in (a) in FIG. 13. In FIG. 13, (c) is an enlarged view of the section surrounded by the square in (b) in FIG. 13.

In FIG. 13, (a) is an enlarged plan view of an actual light distributor including concave regions formed using a laser fabrication device. Arithmetical mean roughness Ra in (c) in FIG. 13 is calculated as 1.690 μm using Equation 6. This arithmetical mean roughness Ra exceeds 1 μm. In (a) and (b) in FIG. 13, it can be seen that the surface of the concave region is rough.

Accordingly, when arithmetical mean roughness Ra of the concave region is high, the light distribution is difficult to control. Moreover, there are instances when light usage efficiency decreases due to the light incident on the concave region being reflected.

(Working Effects)

Next, the working effects of lighting device 1, the lighting device manufacturing method, and light distributor 60 according to this embodiment will be described.

As described above, lighting device 1 according to this embodiment includes light source 30 and light distributor 60 disposed on the light emission side of light source 30. Light distributor 60 includes entrance surface 610 through which light enters and exit surface 620 through which the light that enters through entrance surface 610 exits. At least one of entrance surface 610 and exit surface 620 includes concave regions 630. Each concave region 630 includes a smooth concave surface. Concave regions 630 control distribution of light from light source 30 that is refracted or reflected by optical lens 50 or reflective component 40.

With this configuration, since smooth concave regions 630 are dispersed on light distributor 60, a broader light distribution angle can be controlled compared to when, for example, an optical component is sandblasted. Moreover, compared to when sandblasting is performed, stray light is less likely to be produced with light distributor 60, which inhibits a reduction in light usage efficiency of light source 30.

Accordingly, with lighting device 1, broad distribution of light can be controlled and a reduction in light usage efficiency can be inhibited.

Moreover, light distributor 60 according to this embodiment is disposed on the light emission side of light source 30, and includes: entrance surface 610 through which light from light source 30 enters; exit surface 620 through which the light that enters through entrance surface 610 exits; and concave regions 630 dispersed in at least one of entrance surface 610 and exit surface 620. Each concave region 630 includes a smooth concave surface. Concave regions 630 control distribution of the light from light source 30 that is refracted or reflected by optical lens 50 or reflective component 40.

This light distributor 60 is suitable for a lighting device, and when used in a lighting device, is capable of controlling a broad distribution of light and inhibiting a reduction in light usage efficiency.

Moreover, in lighting device 1 according to this embodiment, arithmetical mean roughness Ra of the concave surface of each concave region 630 is at most 1 μm.

With this, the smaller arithmetical mean roughness Ra is, the smoother the surface of concave region 630 is, and as such, stray light is less likely to be produced by light being scattered by concave regions 630. Accordingly, light usage efficiency is less likely to be reduced.

Moreover, in lighting device 1 according to this embodiment, in a cross section of each concave region 630 of concave regions 630 taken substantially parallel to optical axis J of light source 30, concave region 630 has an approximate arc shape and satisfies Expression 9, where d is a distance from a perimeter of concave region 630 to a line that is perpendicular to the at least one of entrance surface 610 and exit surface 620 that includes concave region 630 and passes through center point O that defines the approximate arc shape.

[MATH. 9]

$$0.05 \leq d \leq 5 \text{ (mm)} \qquad \text{Expression 9}$$

When distance d is too short, light is refracted by concave regions 630, and when distance d is too long, the efficacy of the control of light distribution reduces.

Since distance d is neither too short nor too long, the light distribution of the light transmitted by light distributor 60 can be controlled with certainty.

Moreover, in lighting device 1 according to this embodiment, in a cross section of each concave region 630 of concave regions 630 taken substantially parallel to optical axis J of light source 30, concave region 630 has an approximate arc shape and satisfies Expression 10, where d is a distance from a perimeter of concave region 630 to a line that is perpendicular to the at least one of entrance surface 610 and exit surface 620 that includes concave region 630 and passes through center point O that defines the approximate arc shape.

[MATH. 10]

$$0.05 \leq d \leq 0.5 \text{ (mm)} \qquad \text{Expression 10}$$

This makes it possible to inhibit color unevenness resulting from light from light source 30 since distance d of concave region 630 is even shorter.

Moreover, in lighting device 1 according to this embodiment, in a cross section of each concave region 630 of concave regions 630 taken substantially parallel to optical axis J of light source 30, concave region 630 has an approximate arc shape and satisfies Expression 11, where d is a distance from a perimeter of concave region 630 to a line that is perpendicular to the at least one of entrance surface 610 and exit surface 620 that includes concave region 630 and passes through center point O that defines the approximate arc shape, and D is a depth of concave region 630.

[MATH. 11]

$$10° < \arctan\left(\frac{2dD}{(d^2 - D^2)}\right) < 50° \qquad \text{Expression 11}$$

This makes it possible to control the distribution of light with certainty since angle α of concave region 630 is in a range which is effective for controlling light distribution.

Moreover, in lighting device 1 according to this embodiment, in a cross section of each concave region 630 of concave regions 630 taken substantially parallel to optical axis J of light source 30, concave region 630 has an approximate arc shape and satisfies Equation 12, where d is a distance from a perimeter of concave region 630 to a first line that is perpendicular to the at least one of entrance surface 610 and exit surface 620 that includes concave region 630 and passes through center point O that defines the approximate arc shape, D is a depth of concave region 630, a is an acute angle between a second line that connects center point O and the perimeter of concave region 630 and the first line.

[MATH. 12]

$$\alpha = \arctan\left(\frac{2dD}{(d^2 - D^2)}\right) \qquad \text{Equation 12}$$

Moreover, in lighting device 1 according to this embodiment, each concave region 630 has an approximate ellipse shape in a plan view, and the acute angle along the major axis of the approximate ellipse shape is larger than the acute angle along the minor axis of the approximate ellipse shape by at least 10 degrees.

This makes it possible to control the aspect ratio of the light distribution since the X axis direction angle α is greater than the Y axis direction angle α. This makes it possible to distribute light as desired by the user.

Moreover, in lighting device 1 according to this embodiment, in a plan view taken substantially parallel to optical axis J of light source 30, concave regions 630 each have an approximate circle shape, and satisfy Equation 13, where A is a dot diameter of each concave region 630, B is an inter-dot distance between two adjacent concave regions 630, and T is a dot superimposition rate between two adjacent concave regions 630.

[MATH. 13]

$$T = \left(\frac{A}{B}\right)$$ Equation 13

Dot superimposition rate T is at least 50% and at most 250%.

Compared to when concave region 630 is not formed, this makes it possible to control light of an even larger distribution angle since superimposition rate T of concave region 630 is in a range in which light can be distributed broadly.

Moreover, in lighting device 1 according to this embodiment, the optical component is reflective component 40 that reflects light from light source 30, and reflective component 40 includes a reflectivity of at least 70%.

This makes it possible to inhibit a reduction in light usage efficiency.

Moreover, in lighting device 1 according to this embodiment, light distributor 60 is attachable to and detachable from lighting device 1.

When concave regions 630 are formed in optical lens 50, in order to emit light at a desired angle of distribution, the design of optical lens 50 must be changed on a case by case basis, which increases manufacturing cost and makes it difficult to manufacture optical lens 50 in a short period of time. Moreover, depending on the material of optical lens 50 and the device used to fabricate optical lens 50, there may be a problem in reproducing concave region 630 according to this embodiment. Moreover, when concave regions 630 are formed in optical lens 50, lighting device 1 needs to be taken apart and optical lens 50 needs to be changed out. In this case, attaching and detaching optical lens 50 is bothersome.

However, with lighting device 1, there is no need to change out optical lens 50; light having a desired distribution angle can be achieved by changing out light distributor 60. Accordingly, compared to when optical lens 50 is customized so as to achieve light having a desired distribution angle, manufacturing costs can be inhibited from increasing, and manufacturing can be done in a short period of time. This makes it easy to emit light having a desired distribution angle.

Moreover, the manufacturing method of lighting device 1 according to this embodiment includes forming concave regions 630 that are dispersed and each include a smooth concave surface, by emitting laser light onto workpiece 210 and scanning a focus point of the laser light.

This makes it possible to reduce manufacturing costs since there is no need to prepare a mold that matches the shape and size of concave regions 630. Moreover, compared to when a mold is prepared, it is possible to more quickly form concave regions 630 on workpiece 210 by emitting laser light onto workpiece 210. This makes it possible to quickly manufacture light distributor 60. Moreover, inter-dot distance B can be determined based on the relationship between the frequency of the laser light and the scanning speed, and angle α and fabrication diameter (distance d), which are defining characteristics of concave region 630, can be determined based on the relationship between the output of laser light source 201 and the distance between fθ lens 203 and workpiece 210. Accordingly, since it is possible to manufacture light distributor 60 that realizes a desired light distribution, this gives light distributor 60 greater latitude.

Concave regions 630 are arranged in a matrix in entrance surface 610, and each concave region 630 is an approximate semispherical recess.

Moreover, according to a method of manufacturing lighting device 1 according to this embodiment, in a plan view taken substantially parallel to optical axis J of light source 30, concave regions 630: each have an approximate circle shape, and satisfy Equation 13, where A is a dot diameter of each concave region 630, B is an inter-dot distance between two concave regions 630 that are adjacent, expressed as, in the emitting of the laser light, a scanning speed of the laser light divided by a frequency of the laser light, and T is a dot superimposition rate between two concave regions 630 that are adjacent, and is at least 50% and at most 250%.

Moreover, in lighting device 1 according to this embodiment, concave regions 630 are arranged in a matrix in entrance surface 610, and each concave region 630 is an approximate semispherical recess.

Moreover, in lighting device 1 according to this embodiment, angle α is in a range from 10 degrees to 50 degrees, inclusive, and a light usage efficiency of light distributor 60 is at least 0.9.

Moreover, in lighting device 1 according to this embodiment, in a plan view taken substantially parallel to optical axis J of light source 30, each concave region 630 has an approximate circle shape.

Moreover, in lighting device 1 according to this embodiment, in a cross section of each concave region 630 of concave regions 630 taken substantially parallel to optical axis J of light source 30, concave region 630 satisfies Expression 9, where d is a radius in millimeters of the approximate circle shape of concave region 630 measured on the at least one of entrance surface 610 and exit surface 620 that includes concave region 630.

Moreover, in lighting device 1 according to this embodiment, each concave region 630 is approximately semispherical and defined by a sphere, and a distance between centers of two adjacent concave regions 630 is less than a diameter of the sphere which defines the two adjacent concave regions 630.

Moreover, in lighting device 1 according to this embodiment, the optical component includes at least one of a reflective component and optical lens 50.

Moreover, in lighting device 1 according to this embodiment, the optical component includes the reflective component and optical lens 50. Moreover, an outer diameter of light distributor 60 is approximately equal to an outer diameter of optical lens 50. Further, light distributor 60 is approximately parallel to optical lens 50. Still further, a circumferential edge of each of the light distributor and optical lens 50 includes a plurality of recesses, and a circumferential edge of the reflective component includes a plurality of projections which are configured to project into the plurality of recesses of each of light distributor 60 and optical lens 50.

Other Embodiments

Hereinbefore, the present disclosure has been described based on an embodiment, but the present disclosure is not limited to the embodiment.

Moreover, in the above embodiment, the rear fins are integrally formed with both the tubular part and the barrier wall part, but the configuration of the rear fins is not limited to this example. It is sufficient if the rear fins are integrally formed with at least one of the tubular part and the barrier wall part.

Moreover, in the above embodiment, the front fins are integrally formed with the tubular part, the barrier wall part, and the light blocking part, but the configuration of the front fins is not limited to this example. It is sufficient if the front fins are integrally formed with at least one of the tubular part, the barrier wall part, and the light blocking part.

Moreover, in the above embodiment, in the light source, COB type LEDs are used, but other types of solid-state light-emitting elements may be used. For example, surface mount device (SMD) type LEDs may be used. Moreover, other solid-state light-emitting elements may be used, such as organic electroluminescent (EL) elements.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting device, comprising:
a light source; and
a light distributor disposed on a light emission side of the light source, wherein
the light distributor includes an entrance surface through which light enters and an exit surface through which the light that enters through the entrance surface exits,
at least one of the entrance surface and the exit surface includes concave regions, each of the concave regions including a smooth concave surface,
the concave regions control distribution of light from the light source that is one of refracted and reflected by an optical component,
the optical component includes a reflective component and an optical lens,
an outer diameter of the light distributor is approximately equal to an outer diameter of the optical lens, and
the light distributor is approximately parallel to the optical lens.

2. The lighting device according to claim 1, wherein
in a cross section of each concave region of the concave regions taken substantially parallel to an optical axis of the light source, the concave region:
has an approximate arc shape; and
satisfies the following expression:

$$0.05 \leq d \leq 5$$

where d is a distance in millimeters from a perimeter of the concave region to a line that is perpendicular to the at least one of the entrance surface and the exit surface that includes the concave region and passes through a center point that defines the approximate arc shape.

3. The lighting device according to claim 1, wherein
in a cross section of each concave region of the concave regions taken substantially parallel to an optical axis of the light source, the concave region:
has an approximate arc shape; and
satisfies the following expression:

$$0.05 \leq d \leq 0.5$$

where d is a distance in millimeters from a perimeter of the concave region to a line that is perpendicular to the at least one of the entrance surface and the exit surface that includes the concave region and passes through a center point that defines the approximate arc shape.

4. The lighting device according to claim 1, wherein
in a cross section of each concave region of the concave regions taken substantially parallel to an optical axis of the light source, the concave region:
has an approximate arc shape; and
satisfies the following expression:

$$10° < \arctan\left(\frac{2dD}{(d^2 - D^2)}\right) < 50°$$

where d is a distance from a perimeter of the concave region to a line that is perpendicular to the at least one of the entrance surface and the exit surface that includes the concave region and passes through a center point that defines the approximate arc shape, and
D is a depth of the concave region.

5. The lighting device according to claim 1, wherein
in a cross section of each concave region of the concave regions taken substantially parallel to an optical axis of the light source, the concave region:
has an approximate arc shape; and
satisfies the following equation:

$$\alpha = \arctan\left(\frac{2dD}{(d^2 - D^2)}\right)$$

where d is a distance from a perimeter of the concave region to a first line that is perpendicular to the at least one of the entrance surface and the exit surface that includes the concave region and passes through a center point that defines the approximate arc shape,
D is a depth of the concave region, and
α is an acute angle between a second line that connects the center point and the perimeter of the concave region and the first line.

6. The lighting device according to claim 5, wherein
each of the concave regions has an approximate ellipse shape in a plan view, and
the acute angle along the major axis of the approximate ellipse shape is larger than the acute angle along the minor axis of the approximate ellipse shape by at least 10 degrees.

7. The lighting device according to claim 5, wherein
α is in a range from 10 degrees to 50 degrees, inclusive, and
a light usage efficiency of the light distributor is at least 0.9.

8. The lighting device according to claim 1, wherein
in a plan view taken substantially parallel to an optical axis of the light source, the concave regions:
each have an approximate circle shape, and
satisfy the following equation:

$$T = \left(\frac{A}{B}\right)$$

where A is a dot diameter of each of the concave regions,
B is an inter-dot distance between two of the concave regions that are adjacent, and
T is a dot superimposition rate between two of the concave regions that are adjacent, and is at least 50% and at most 250%.

9. The lighting device according to claim 1, wherein
the reflective component of the optical component reflects light from the light source, and
the reflective component has a reflectivity of at least 70%.

10. The lighting device according to claim 1, wherein
the light distributor is attachable to and detachable from the lighting device.

11. The lighting device according to claim 1, wherein
the concave regions are arranged in a matrix in the entrance surface, and each of the concave regions is an approximate semispherical recess.

12. The lighting device according to claim 1, wherein
in a plan view taken substantially parallel to an optical axis of the light source, each of the concave regions has an approximate circle shape.

13. The lighting device according to claim 12, wherein
in a cross section of each concave region of the concave regions taken substantially parallel to the optical axis of the light source, the concave region satisfies the following expression:

$$0.05 \leq d \leq 5,$$

where d is a radius in millimeters of the approximate circle shape of the concave region measured on the at least one of the entrance surface and the exit surface that includes the concave region.

14. The lighting device according to claim 12, wherein
each of the concave regions is approximately semispherical and defined by a sphere, and
a distance between centers of two adjacent ones of the concave regions is less than a diameter of the sphere which defines the two adjacent ones of the concave regions.

15. The lighting device according to claim 1, wherein
a circumferential edge of each of the light distributor and the optical lens includes a plurality of recesses, and
a circumferential edge of the reflective component includes a plurality of projections which are configured to project into the plurality of recesses of each of the light distributor and the optical lens.

16. A method of manufacturing the lighting device according to claim 1, the method comprising:
forming the concave regions that each include the smooth concave surface, by emitting laser light onto a workpiece and scanning a focus point of the laser light.

17. The method according to claim 16, wherein
in a plan view taken substantially parallel to an optical axis of the light source, the concave regions:
each have an approximate circle shape, and
satisfy the following equation:

$$T = \left(\frac{A}{B}\right)$$

where A is a dot diameter of each of the concave regions, B is an inter-dot distance between two of the concave regions that are adjacent, expressed as, in the emitting of the laser light, a scanning speed of the laser light divided by a frequency of the laser light, and
T is a dot superimposition rate between two of the concave regions that are adjacent, and is at least 50% and at most 250%.

18. The lighting device according to claim 1, wherein the optical lens transmits and controls distribution of incident light from the reflective component.

19. A lighting device comprising:
a light source; and
a light distributor disposed on a light emission side of the light source,
wherein the light distributor includes an entrance surface through which light enters and an exit surface through which the light that enters through the entrance surface exits,
at least one of the entrance surface and the exit surface includes concave regions, each of the concave regions including a smooth concave surface,
the concave regions control distribution of light from the light source that is one of refracted and reflected by an optical component, and
an arithmetical mean roughness of the smooth concave surface is at most 0.4 µm.

20. A light distributor disposed on a light emission side of a light source, the light distributor comprising:
an entrance surface through which light from the light source enters;
an exit surface through which the light that enters through the entrance surface exits; and
concave regions dispersed in at least one of the entrance surface and the exit surface, each of the concave regions including a smooth concave surface, wherein
the concave regions control distribution of the light from the light source that is one of refracted and reflected by an optical component,
the optical component includes a reflective component and an optical lens,
an outer diameter of the light distributor is approximately equal to an outer diameter of the optical lens, and
the light distributor is approximately parallel to the optical lens.

* * * * *